No. 854,925. PATENTED MAY 28, 1907.
J. D. BUCHANAN.
EXCAVATING MACHINE.
APPLICATION FILED AUG. 3, 1906.
3 SHEETS—SHEET 3.
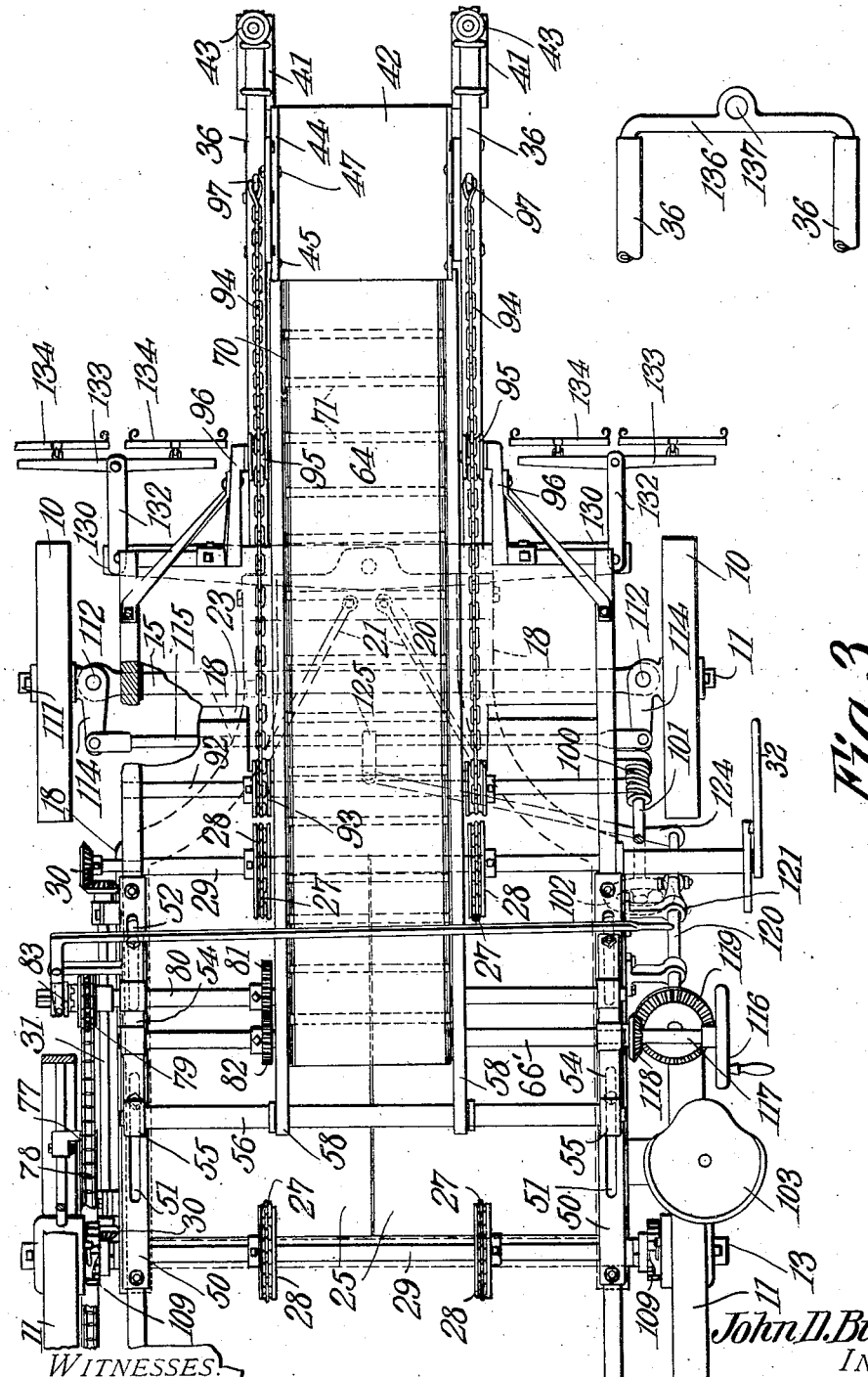

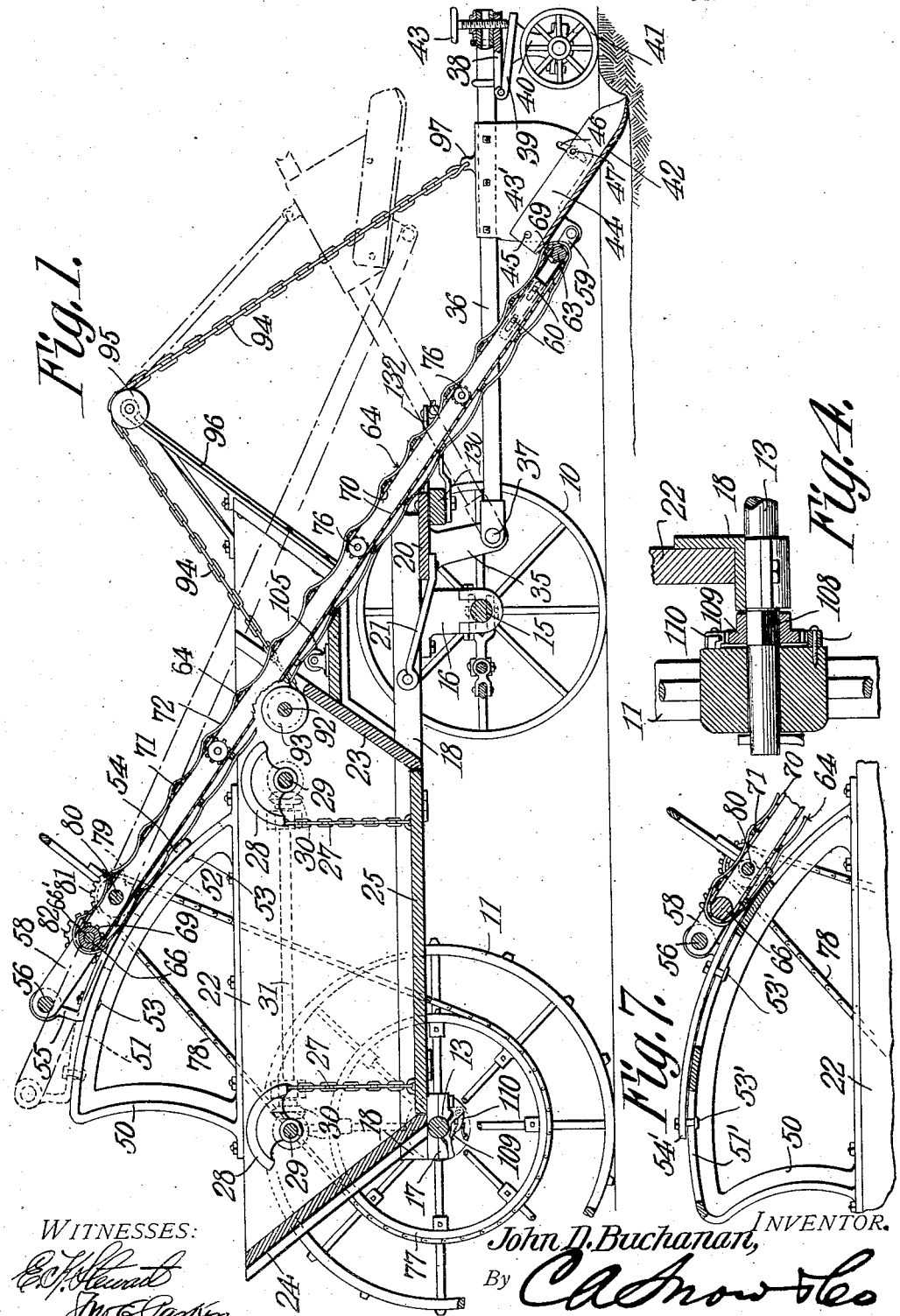

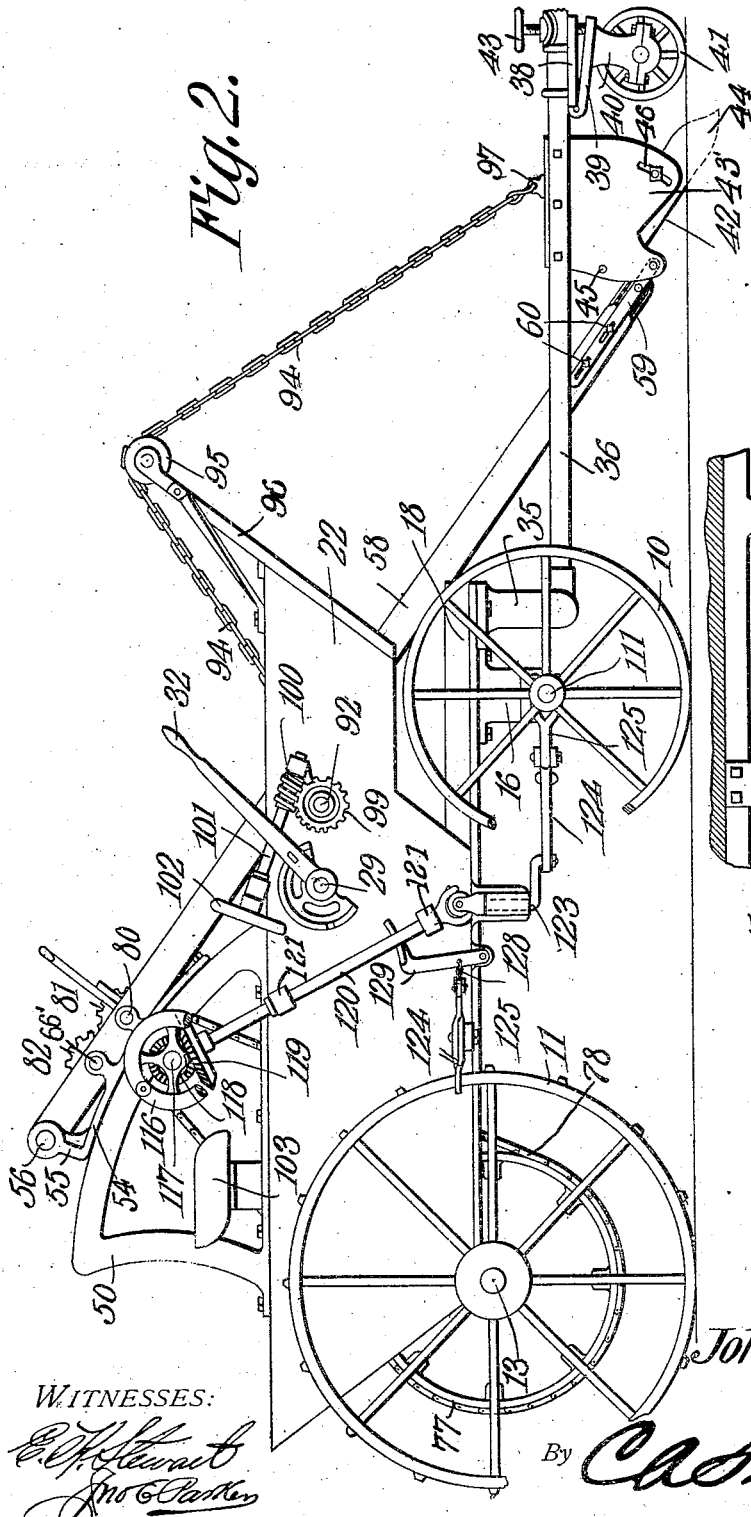

UNITED STATES PATENT OFFICE.

JOHN D. BUCHANAN, OF RUBYVILLE, TENNESSEE, ASSIGNOR OF ONE-HALF TO JAMES K. JEFFRIES, OF MEMPHIS, TENNESSEE.

EXCAVATING-MACHINE.

No. 854,925.      Specification of Letters Patent.      Patented May 28, 1907.

Application filed August 3, 1906. Serial No. 329,128.

*To all whom it may concern:*

Be it known that I, JOHN D. BUCHANAN, a citizen of the United States, residing at Rubyville, in the county of Shelby and State of Tennessee, have invented a new and useful Excavating-Machine, of which the following is a specification.

This invention relates to machines employed for excavating, ditching, grading and other purposes, and has for one of its objects to provide a novel form of machine in which a cutting and conveying mechanism is arranged on a wheeled receptacle into which the dirt or other material is delivered, the receptacle being provided with pivoted bottom or gate members, so that it may be conveniently emptied.

A further object of the invention is to provide a machine of this type which may be propelled by a motor or drawn along by any desired number of draft animals, the operation of excavating and carrying away the excavated material being continuous.

A still further object of the invention is to provide a machine of this type in which a horizontal cutting blade or similar member is employed, and to provide a novel means for adjusting the depth of cut.

A still further object of the invention is to provide a machine of this type in which the conveying and excavating mechanism may be readily adjusted to inoperative position when the receptacle has been filled, so that the receptacle may be readily moved to any dumping point.

A still further object of the invention is to provide a novel form of driving mechanism which will permit of adjustment of the conveyer to operative and inoperative positions without being drawn out of gear.

A still further object of the invention is to provide an improved mechanism by which the carrying wheels of the receptacle are employed for the purpose of driving the conveyer, and so arrange the mechanism that the conveyer will be driven only as the receptacle is moved forward, and will not be operated when the receptacle or wagon is moving in the reverse direction.

A still further object of the invention is to provide a novel form of dumping mechanism for controlling the movement of the pivoted gates or bottom members of the receptacle.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a longitudinal sectional elevation of an excavating machine constructed in accordance with the invention. Fig. 2 is a side elevation of the machine. Fig. 3 is a plan view of the machine, parts being shown in section. Fig. 4 is a detail sectional view drawn to an enlarged scale, through one of the rear wheels, showing a portion of the rear axle in elevation. Fig. 5 is a plan view, partly in section of the wheel brake. Fig. 6 is a detail view illustrating a slight modification, wherein the forward ends of the draft arms are connected by a cross bar. Fig. 7 illustrates a slight modification of the construction of the mechanism for permitting raising and lowering of the excavator and conveyer.

Similar numerals of reference are employed to indicate corresponding parts throughout the several figures of the drawings.

The machine is supported on front wheels 10 and rear wheels 11, the latter being free to rotate on the ends of the axle 13, while the latter also rotates when the machine is traveling forward, and from this axle the conveyer receives motion.

The central portion 15 of the front axle is rigidly clamped in brackets 16, while the rear axle finds bearings in brackets 17, these brackets being connected by longitudinal sill members 18 that are formed of angle iron, the front ends of said members being bent inward on curved lines in order to permit perfect freedom of movement of the front wheels while steering. The front ends of the angle bars are connected by a rigid cross bar 20 which is connected to the bars 18 by suitable braces 21.

The opposite sides 22 of the receptacle are preferably arranged in vertical position, while the front and rear walls 23 and 24 are inclined in order to form a hopper-like receptacle, the bottom of which is formed of a pair of hinged gates 25.

The gates 25 are supported by chains 27 arranged in two sets, said chains being secured to grooved segments 28 that are carried by a pair of shafts 29 extending through the side walls of the receptacle and coupled together at one end by miter gears 30, and a shaft 31. At the opposite end of one of the shafts is arranged a lever 32 which may be turned for the purpose of dumping the load, or for raising the dumping gates after the receptacle has been emptied.

Depending from the cross bar 20 at the front of the machine is a pair of brackets 35 from which project arms 36, said arms being pivoted to the bracket by pins 37. At the front end of each arm and secured to the lower side thereof, is a plate 38 to the rear end of which is pivoted a plate or bar 39 carrying a bracket 40, the latter having suitable bearings for the support of a small depth gage wheel 41 which runs along the surface of the ground in advance of, and to one side of the cutting or excavating blade 42. The forward end of each arm is provided with a threaded opening for the passage of a handled adjusting screw 43, the lower end of which bears on the plate 39, so that the latter may be adjusted to any angle with respect to the plate 38 for the purpose of controlling the depth of cut.

Bolted to the inner face of each of the arms 36 is a pendent plate 43', and between these plates is arranged a cutting or excavating blade 42, said blade having vertical side flanges 44 which are pivoted to the plates 43' by suitable pins 45. Near the front edge of each plate 43 is an arcuate slot 46 arranged for the reception of a bolt 47 by which the cutting blade may be adjusted to different angular positions.

Secured to the upper edge of each of the side walls of the receptacle is a bracket 50, the top of which is curved on the line struck from the center of rotation of the rear axle or shaft 13. The curved face of each of these brackets is provided with a pair of slots 51 and 52, these serving for the reception of a pair of bolts 53 that are carried by an arcuate bar 54 arranged to rest on top of the bracket. At one end of the bar 54 is an approximately vertical arm 55, and these two arms have bearings for the reception of the opposite ends of a bar 56.

On the bar 56 is pivoted a pair of conveyer frame beams 58 which may be of any shape and size and formed of any suitable material. To the lower ends of these beams are secured small bars 59 which have slots to permit adjustment and are locked in place by bolts 60. The lower and forward ends of the bars 59 are pivotally connected to the side plates 43, and said bars further carry a guiding roller 63 over which passes a conveyer belt 64. The upper and rear ends of the beams 58 carry an additional roller 66 around which the conveyer belt travels, and said belt may be kept as taut as desired by proper adjustment of the bars 59 with relation to the beams 58.

The ends of the rolls 63 and 66 are reduced in diameter and are provided with sprocket wheels 69. These sprocket wheels serve to receive link belts 70, and said belts are connected at intervals by cross bars 71, and over the cross bars is placed the continuous conveyer belt 64 that is formed of heavy canvas or other suitable material, the opposite edges of the belt being secured to the link belts, and intervening portions of the conveyer belt being secured to the cross bars 71.

In manufacturing the conveyer belt, a slight excess of material is allowed, so that when the belt is in operation a series of pockets will be formed, thus allowing the working of the conveyer at a greater angle to the horizontal than would otherwise be possible. As the material is carried up and the successive pockets are engaged by the roller 66, said pockets will be flattened or straightened out by the roller, and all of the material will be discharged from said pockets and will fall into the dumping receptacle. The link belts are preferably supported at intervals by intermediate sprockets wheels 76 in order to prevent sagging of the belts.

The conveyer is driven from the rear axle 13 of the machine, and for this purpose one of the wheels 11 carries an annular rack 77 which is bolted or otherwise secured to the spokes of the wheel. Around these sprocket wheels extends a link belt 78 which also passes around the sprocket wheel 79 on a shaft 80 that has bearings on the slidable bars 54 and also in the conveyer beams 58. The shaft 80 carries a gear 81 which intermeshes with a gear 82 on the shaft 66' of the upper roller 66.

By preference the sprocket wheel 79 is loose on the shaft and is provided with a clutch hub which may be engaged by a clutch 83 that is feathered on the shaft and may be moved lengthwise thereof.

The two bars or frames 54 are slidable on the brackets 50 for the purpose of moving the conveyer to operative and inoperative positions, and for this purpose a winding shaft 92 is mounted in suitable bearings formed in the side walls of the receptacle and carries a pair of winding drums 93 to which are secured the ends of chains 94. These chains pass up over sheaves 95 that are mounted on frame carried brackets 96 and extend down to eyes 97 near the outer ends of the arms 36. This winding shaft is provided with a suitable worm wheel 99 which intermeshes with a worm 100 carried by a short shaft 101 that has an operating handle 102 within convenient reach of the operator's seat 103.

The conveyer is in part supported by a roller 105 that is mounted in suitable bearings adjacent to the winding shaft 92, and this permits the necessary longitudinal movement of the conveyer during its adjustment between the full line position and the dotted line position of Fig. 1, the latter being the position assumed when the machine is traveling to and from the field of operation.

In some cases the arrangement of the upper and rear conveyer support may be altered as shown in Fig. 7. In this case the brackets 50 are provided with slots 51' for the reception of headed bolts or pins 53' which are carried by a slidable bar 54' and the conveyer mechanism is connected to the forward end of this bar instead of to the rear end thereof, as shown in Fig. 1. In both cases, however, the brackets serve as supports for the rear end of the conveyer and maintain uniform distances between the rear axle 13 and the main shaft 81 so that the link belt 78 is at all times maintained in proper position and cannot become disengaged from its sprocket wheels.

The propelling driving mechanism is arranged to operate only during the forward movement of the receptacle and conveyer, and this is accomplished by having the wheels 11 loose on their shaft, (Fig. 4), and providing the shaft with a non-circular portion 108 on which is secured a ratchet wheel 109 that is engaged by one or more pawls 110, the latter being carried by the hubs of the rear wheels and operating during the forward movement for the purpose of imparting movement to the conveyer belt. If the apparatus is backing the pawls will click idly over the ratchet wheel and no movement will be imparted to the axle 13.

For steering purposes the front wheels are carried by short spindles 111 which are pivoted at 112 to the front axle. The spindles are provided with rearwardly extending arms 114 which are connected by a cross bar 115 that is disposed parallel with the axle, and as this bar is moved in the direction of its length, the two front wheels will be simultaneously turned to the same angle. Arranged in front of the operator's seat is a steering handle 116 that is secured on a short shaft 117, said shaft carrying a bevel pinion 118 in mesh with a bevel gear 119 on an inclined shaft 120 that is mounted in suitable brackets 121 carried by one side of the receptacle. The lower end of the shaft 120 has a universal joint connection with a crank shaft 123 which is connected by a link 124 and bracket 125 to the cross bar 115. This affords a convenient means for effecting the necessary movement of the bar 115 from the operator's seat and the vehicle may be readily steered in any direction.

The brake may be of any type, but preferably is formed of a pair of cross levers 124 that are pivoted on a bracket 125. The rear ends of these levers are arranged to partly embrace the rim of one of the rear wheels 11, and the forward ends of said levers are connected to a pair of pivotally connected levers 127. From the pivot pin of the links extends a chain 128 to a pedal lever 129 that is pivoted to the frame, and has a pedal piece arranged within convenient reach of the operator's seat.

In propelling the device, a gasolene or other motor may be used, or the device may be connected to a traction engine and either pushed or pulled along. In many cases, however, it is preferred to employ draft animals, and for this purpose a cross bar 130 is secured below the cross bar 20 and extends outward to points near the front wheels. This cross bar carries a pair of links 132 which may carry swingle or double trees for the attachment of two or four horses or other animals. In the present instance a double tree 133 is shown attached to each link 132, and to each double tree is connected a pair of swingle trees 134. It may, also, be advisable to employ an additional draft animal or to provide a connection for traction purposes at the center of the front end of the machine, and for this purpose the arms 36 are preferably formed of tubes, the openings of which may receive the ends of a U-shaped draft bar 136 having at its center an eye 137 for the reception of a hook or other means of connection with the draft animal or traction device.

In operation, the parts are adjusted to the position shown in Fig. 1 and the screws 43 are turned in order to adjust the depth of cut. The apparatus is then moved forward either by motor mechanism or draft animals, and the cutting blade 42 will act to cut away the clay or other material. The excavated material will be forced to travel over the blade until it drops in the pockets of the conveyer, and after traveling upward to the roller 66 the pockets are flattened out as the conveyer passes over said roller, so that the discharge of the excavated material into the receptacle is assured.

When the receptacle has been filled, the parts may be readily adjusted to the position shown in dotted lines in Fig. 1, and then the apparatus may be moved to a dumping position and the bottom gates released to allow the discharge.

I claim:—

1. In apparatus of the class described, a wheeled receptacle, an arm extending forwardly of and pivoted to said receptacle, an inclined conveyer frame, the forward end of which is supported by the arm, the rear end of the conveyer being loosely supported, means for raising said arm to adjust the frame to inoperative position, an endless conveyer supported by the frame, and an excavating blade secured to the lower and forward end of the frame.

2. In apparatus of the class described, the combination with a wheeled receptacle, of a pair of arms pivoted to the forward end of the receptacle, an inclined conveyer frame having its upper rear end supported by the receptacle, means for connecting the lower and forward end of the frame to the arms, means for supporting the arms, an excavator blade, and an endless conveyer supported by the frame and arranged to carry the excavated material from the blade to the receptacle.

3. In apparatus of the class described, a wheeled receptacle, a pair of spaced arms pivoted to the forward portion thereof, an adjustable means for supporting said arms, a conveyer frame, the upper rear end of which extends over the receptacle, means for connecting the lower front end of the frame to the arms, an endless conveyer on said frame, and an excavator blade adjustably secured to the forward ends of the arms.

4. In apparatus of the class described, a wheeled receptacle, arms extending forwardly of and pivoted to said receptacle, a pair of hangers at the forward ends of said arms, a blade carried by the hangers, a conveyer frame, means for pivotally connecting the lower forward end of the conveyer frame to said hangers, and an endless conveyer supported by the frame.

5. In apparatus of the class described, a wheeled receptacle, a pair of arms extending forwardly of and pivoted to the receptacle, hangers on said arms, an excavating blade adjustably secured to the hangers, a conveyer frame, the lower forward end of which is pivoted to the hangers, the rear end of said frame being slidably supported by the receptacle, an endless conveyer carried by the frame, and means for adjusting the arms to vary the depth of cut of the blade.

6. In apparatus of the class described, the combination with a wheeled receptacle, of a pair of arms extending forwardly of and pivoted to the receptacle, a vertically adjustable supporting means for the arms, hangers carried by said arms, an excavating blade supported by the hangers, a conveyer frame having its lower forward end pivoted to the hangers, the rear end of said frame being slidably mounted over the receptacle, an endless conveyer supported by the frame, and means for raising said arms to adjust the conveyer and blade to inoperative position.

7. In a device of the class described, the combination with a wheeled receptacle, a pair of arms extending forwardly of and pivoted to the receptacle, vertically adjustable supports for the forward ends of said arms, a pair of hangers carried by the arms, an excavating blade carried by said hangers, an inclined conveyer frame, the forward end of which is pivoted between the hangers, the rear end of said frame being slidably supported above the receptacle, and an endless conveyer carried by said frame.

8. In apparatus of the class described, the combination with a load receptacle, of a pair of arms extending forwardly of and pivoted to the receptacle, vertically adjustable supports for the forward ends of said arms, a pair of hangers carried by the arms, an adjustable excavating blade carried by the hangers, means for locking said blade in adjusted position, an inclined conveyer frame, the forward end of which is pivoted between the hangers, slidable supports for the upper end of said frame, an endless conveyer carried by the frame, and means for raising the arms to elevate the blade and conveyer to inoperative position.

9. In apparatus of the class described, a wheeled receptacle, a pair of arms pivoted to the forward portion thereof, a pair of wheeled supports for the forward ends of the arms, means for adjusting said supports to vary the vertical depth of cut, a pair of hangers carried by the arms, an excavating blade pivoted to said hangers and adjustable to varying angular positions, means for locking said blades in adjusted position, a conveyer frame, the lower end of which is pivoted between the hangers, slidable supports for the upper ends of the frame, and an endless conveyer mounted on said frame.

10. In apparatus of the class described, a wheeled receptacle, a pair of arms pivoted thereto, plates secured to the lower faces of the outer ends of the arms, bars pivoted to said plates, hangers depending from the bars, wheels journaled in said hangers, screws passing through the arms and plates and bearing on the bars, a pair of plates depending from the inner faces of the arms, a cutting blade pivoted between said plates and adjustable to varying angular positions, means for locking said blade in adjusted position, a conveyer frame having its lower forward end pivoted between the plates, an endless conveyer mounted on the frame, sheave supporting brackets, arm lifting chains guided over said brackets, and winding drums to which the opposite ends of the chains are connected.

11. In apparatus of the class described, the combination with a wheeled receptacle, of a pair of arcuate brackets carried thereby, a cutting blade, an endless conveyer, a conveyer frame, the rear end of which is slidably mounted on the brackets, a driving axle, gearing connections between the driving axle and the conveyer, the arcuate faces of the brackets being struck on lines from the center of the axle to prevent disconnection of the gearing during adjustment of the conveyer.

12. In apparatus of the class described, the combination with a wheeled receptacle, of a revoluble axle on which the rear wheels are mounted, a conveyer frame, an endless conveyer thereon, an excavating blade arranged at the forward end of the conveyer, a pair of brackets having arcuate surfaces struck from the center of rotation of the axle, said brackets being slotted, slidable arcuate bars mounted on the brackets and carrying headed bolts extending through the slots, said bars having bearings for the upper driving shaft of the conveyer, a sprocket wheel, on said shaft, a driving sprocket having its center of rotation coincident with the axis of the axle, and a link belt extending between the two sprockets, whereby adjustment of the conveyer is permitted without disengagement of the driving connections.

13. In apparatus of the class described, the combination with a wheeled receptacle, of an axle on which the rear wheels are mounted, a pair of brackets having arcuate faces struck from the center of rotation of the axle, a pair of arcuate bars slidably mounted on the bracket, a conveyer frame having its upper end pivotally connected to said bars, a conveyer driving shaft also mounted on the bars, a sprocket wheel on the shaft, a driving sprocket having its center of rotation coincident with that of the shaft, and a link belt connecting the two sprockets.

14. In apparatus of the class described, the combination with the supporting wheels and axles, of a pair of bars connected to the axles and extending parallel with each other, the forward ends of said bars being bent into relatively close relation, a cross bar connecting the forward ends of the bars, side and end walls arranged to form a receptacle, and a draft gear attaching bar carried by said cross bar.

15. In apparatus of the class described, the combination with the supporting wheels, of the axles, brackets on said axles, a pair of parallel side bars carried by the brackets, a cross bar connecting the forward ends of said side bars, side and end members carried by the side bars, and forming a receptacle, a pair of arms extending forwardly of the cross bar and pivoted thereto, an endless conveyer, and an excavating blade between said arms, a draft attaching bar extending transversely of the machine, and draft attachments carried by the opposite end portions of said bar.

16. In apparatus of the class described, the combination with a wheeled receptacle, of a pair of tubular arms pivoted to the forward end thereof, an excavating blade, and a conveyer arranged between said arms, and a U-shaped draft bar having its opposite arms adapted to fit within the ends of the tubular arms.

In testimony that I claim the foregoing as my own, I have hereto affixed my signature in the presence of two witnesses.

JOHN D. BUCHANAN.

Witnesses:
E. HUME TALBERT,
M. J. WARRINER.